(12) United States Patent
Kishiyama et al.

(10) Patent No.: US 10,104,562 B2
(45) Date of Patent: Oct. 16, 2018

(54) RADIO COMMUNICATIONS SYSTEM, BASE STATION, USER APPARATUS, AND METHOD

(71) Applicant: NTT DOCOMO, INC., Tokyo (JP)

(72) Inventors: Yoshihisa Kishiyama, Kangawa (JP); Motohiro Tanno, Kanagawa (JP); Mamoru Sawahashi, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 50 days.

(21) Appl. No.: 14/256,088

(22) Filed: Apr. 18, 2014

(65) Prior Publication Data

US 2014/0226515 A1 Aug. 14, 2014

Related U.S. Application Data

(63) Continuation of application No. 13/001,073, filed as application No. PCT/JP2009/061576 on Jun. 25, 2009, now Pat. No. 8,743,714.

(30) Foreign Application Priority Data

Jul. 1, 2008 (JP) .................................. 2008-172813

(51) Int. Cl.
 *H04J 1/16* (2006.01)
 *H04W 24/08* (2009.01)
 (Continued)

(52) U.S. Cl.
 CPC ........... *H04W 24/08* (2013.01); *H04W 36/30* (2013.01); *H04W 36/08* (2013.01)

(58) Field of Classification Search
 None
 See application file for complete search history.

(56) References Cited

U.S. PATENT DOCUMENTS

2001/0048711 A1* 12/2001 Sun ........................ H04B 1/707
 375/145
2002/0136271 A1* 9/2002 Hiramatsu ............ H04L 1/0003
 375/141

(Continued)

FOREIGN PATENT DOCUMENTS

EP 1 898 542 A1 3/2008
EP 1 983 792 A1 10/2008

(Continued)

OTHER PUBLICATIONS

3GPP TSG-RAN WG1 Meeting #44, R1-060670, Denver, USA, Feb. 13-17, 2006, "Interference Mitigation by Partial Frequency Reuse," 5 pages.

(Continued)

*Primary Examiner* — Willie J Daniel, Jr.
(74) *Attorney, Agent, or Firm* — Osha Liang LLP

(57) ABSTRACT

A mobile communications system having a first base station and one or more second base stations is disclosed, wherein the first base station includes a first generator which generates a first known signal for use in common between the first base station and the second base station and a second known signal use specific to each of the first base station and the second base station, and a radio transmitter which wirelessly transmits, to a subordinate terminal apparatus, the first known signal and the second known signal which are generated by the first generator.

6 Claims, 10 Drawing Sheets

(51) Int. Cl.
*H04W 36/30* (2009.01)
*H04W 36/08* (2009.01)

(56) References Cited

U.S. PATENT DOCUMENTS

| | | | |
|---|---|---|---|
| 2006/0276189 A1 | 12/2006 | Kiernan et al. | |
| 2007/0070944 A1* | 3/2007 | Rinne | H04B 7/0669 370/329 |
| 2009/0296563 A1 | 12/2009 | Kishiyama et al. | |
| 2009/0296925 A1 | 12/2009 | Kishiyama et al. | |
| 2010/0150000 A1* | 6/2010 | Sakata | H04L 5/0007 370/252 |
| 2010/0317384 A1* | 12/2010 | Sakai | H04L 5/005 455/501 |

FOREIGN PATENT DOCUMENTS

| | | | |
|---|---|---|---|
| JP | 2006-311475 A | | 11/2006 |
| JP | 2007-089113 A | | 4/2007 |
| JP | 2007-214822 A | | 8/2007 |
| JP | 2007214822 A | * | 8/2007 |
| JP | 2008-124576 A | | 5/2008 |
| WO | 2006107701 A2 | | 10/2006 |
| WO | 2007/091607 A1 | | 8/2007 |

OTHER PUBLICATIONS

3GPP TS 36.211 V8.3.0, May 2008, "Physical Channels and Modulation," 77 pages.
International Search Report issued in PCT/JP2009/061576, dated Aug. 4, 2009, with translation, 7 pages.
Written Opinion issued in PCT/JP2009/061576, dated Aug. 4, 2009, 3 pages.
Japanese Office Action for Application No. 2008-172813, dated May 22, 2012 (4 pages).
Extended European Search Report dated May 19, 2014 in related European Application No. 09773376.0 (6 pages).
Extended European Search Report dated Feb. 5, 2015 in related European Application No. 14186360.5 (6 pages).
Office Action in counterpart Korean Patent Application No. 10-2011-7000647, dated Jul. 7, 2015 (7 pages).
Office Action in counterpart Chinese Patent Application No. 201410079803.0, dated Aug. 23, 2016 (9 pages).
Office Action issued in corresponding Chinese Application No. 201410079803.0, dated Feb. 28, 2017 (11 pages).

* cited by examiner

Related Art

Related Art

RADIO COMMUNICATIONS SYSTEM, BASE STATION, USER APPARATUS, AND METHOD

CROSS-REFERENCE TO RELATED APPLICATIONS

This application is a continuation of U.S. patent application Ser. No. 13/001,073 filed on Dec. 23, 2010, which is a national stage application of PCTJP2009061576 filed Jun. 25, 2009, which claims priority to Japanese Patent Application No. 2008-172813, filed Jul. 1, 2008. The priority applications are hereby incorporated by reference in their entirety.

BACKGROUND OF THE INVENTION

1. Field of the Invention

The present invention generally relates to radio communications systems and particularly relates to radio communications systems, base station and user apparatuses, and methods.

2. Description of the Related Art

In a related-art time division multiple access (TDMA) mobile communications system, mutually different frequencies are used in neighboring cells. A certain group of frequencies is used for a set of multiple cells, while the same group of frequencies is used for a different set of cells that are geographically distant. Such a scheme is preferable from a viewpoint of reducing other-cell interference, but is not high in frequency utilization efficiency.

On the other hand, in a W-CDMA (Wideband Code Division Multiple Access) scheme such as IMT-2000, users are distinguished with spread codes, so that the same frequency is used at all cells. Such a technique is called "one-cell frequency repetition". The one-cell frequency repetition significantly increases frequency utilization efficiency and system capacity. It is anticipated that realization of the one-cell frequency repetition is also going to be needed even in future mobile communications systems such as IMT-Advanced (also called LTE-Advanced in 3GPP (3rd Generation Partnership Project), which is to be studied in the future.

However, there is a concern for a problem that, as the same frequency is used among neighboring cells, interference level (intercell interference) is likely to become large, particularly at a cell edge.

For intracell interference, in the W-CDMA scheme, OVSF (orthogonal variable spreading factor) code is used for downlink in order to realize intracell orthogonalization (i.e., interuser orthogonalization). However, in the W-CDMA scheme, orthogonalization cannot be realized in a multi-path environment, so that it is not orthogonal for uplink. In E-UTRA (Evolved UMTS Terrestrial Radio Access) scheme, orthogonalization is realized by performing frequency scheduling at a base station for both uplink and downlink.

On the other hand, for the intercell interference, in E-UTRA scheme, a technique called intercell interference coordination (ICIC) is used. In this technique, in addition to the fact that a frequency which is common to all cells is used, a frequency which differs from cell to cell is used at the cell edge (see Non-patent document 1).

FIG. 1 is a diagram illustrating the intercell interference coordination, which is adopted in the E-UTRA scheme. In the intercell interference coordination, radio resources are divided into radio resources R1-R3 which are usable only at corresponding base stations, and radio resources R4-R8 which are usable in a manner common to all of the base stations. The radio resources R1-R3 are frequencies allocated to the user at the cell edge, while radio resources R4-R8 are frequencies allocated to a user of a region other than the cell edge (for example, a user located in the vicinity of the base station, etc.) The radio resource R1 is used for a user belonging to the cell edge of a base station BS1, while it is not used for a neighboring base station. Similarly, the radio resource R2 is used for a user belonging to the cell edge of a base station BS2, while it is not used for a neighboring base station. The radio resource R3 is used for a user belonging to the cell edge of a base station BS3, while it is not used for a neighboring base station. Thus, the user of a cell edge of the base stations BS1-BS3 may conduct communications with small interference.

Information on a radio resource usable only at one of the base stations is shared among the base stations by using a backhaul (core network) and/or radio control signal. Here, such intercell interference coordination is called distributed autonomous intercell interference coordination.

Moreover, in order to reduce the intercell interference, a technique is also being studied in which one base station collectively manages radio resources of neighboring base stations. Such an intercell interference technique is used for decreasing intersector interference when a cell of a base station is divided into multiple sectors, or for decreasing intercell interference when there is a protruding cell.

FIG. 2 is a diagram illustrating intercell interference coordination for one base station BS1 to collectively manage radio resources of neighboring base stations BS2 and BS3. The base station BS1, which is connected to the neighboring base stations BS2 and BS3 via an optical fiber, etc., collectively allocates radio resources used by the neighboring base stations BS2 and BS3. For example, the base station BS1 allocates radio resources R1, R2, and R5 to users within the base station BS1, allocates radio resources R3 and R4 to users within the base station BS2, and allocates radio resources R6-R8 to users within the base station BS3.

In this way, the base station BS1 may allocate radio resources without causing interference. Here, such intercell interference coordination is called central control intercell interference coordination. Moreover, a base station which collectively manages radio resources is called a control base station or a central control base station, while abase station which manages radio resources with the control base station is called a remote base station.

Non-patent Document 1: 3GPP R1-060670, Siemens, "Interference Mitigation by Partial Frequency Reuse"

Non-Patent Document 2: 3GPP TS36.211

SUMMARY OF THE INVENTION

Problem(s) to be Solved by the Invention

For distributed autonomous intercell interference coordination, radio resources for the cell-edge user are occupied by all of the base stations. For example, when the cell-edge user of the base station BS1 increases, allocation of the radio resource R1 increases. This information may be reported in a backhaul control signal to another base station to increase the radio resource R1. However, this represents low-speed control, so that a quick intercell orthogonalization cannot be realized.

On the other hand, for central control intercell interference coordination, the control base station collectively manages radio resources, making it possible to realize quick intercell orthogonalization. However, when the number of base stations managed by the control base station increases, processing burden of the control base station increases.

Moreover, for the distributed autonomous intercell interference coordination, a reference signal transmitted by each base station includes a sequence which differs from cell to cell. In other words, a cell ID is applied which differs from cell to cell. The reference signal is a signal which is known between the base station and the user apparatus. The user apparatus performs channel estimation, and measurement of received quality based on the reference signal.

When the reference signal is applied to a central control cell, a separate optimization is required. For the central control cell, it is expected to be applied to a cell with a small cell radius, so that handover occurs frequently when a sequence which differs from cell to cell is included in a reference signal.

Moreover, when a sequence which is common to all cells is included in a reference signal, received quality for each cell cannot be measured.

Thus, the present invention is intended to solve the problems as described above, and the object of the present invention is to provide a radio communications system, a base station, a user apparatus, and a method that make it possible to reduce handover processing burden between the base station and neighboring base stations, and to measure received quality in each cell.

Means for Solving the Problem

In order to solve the problem as described above, the present mobile communications system has a first base station and one or more second base stations, wherein the first base station includes a first generator which generates a first known signal for use in common between the first base station and the second base station and a second known signal for use specific to each of the first base station and the second base station, and a first radio transmitter which wirelessly transmits, to a subordinate terminal apparatus, the first known signal and the second known signal which are generated by the first generator.

The present base station includes a first known signal generator which generates a first known signal for use in common between one or more base stations to be supervised;

a second known signal generator which generates multiple second known signals for use specific to the respective base stations;

a radio transmitter which wirelessly transmits, to a subordinate terminal apparatus, the first known signal and second known signals generated by the first known signal generator and the second known signal generator; and a wired transmitter which transmits, over wire to the one or more base stations, information for generating the first known signal and which transmits, over wire to the one or more base stations, information for generating the second known signals to be used specifically by the respective base stations.

The present user apparatus is a user apparatus in a mobile communications system having a first base station and a second base station, the user apparatus including a received quality measuring unit which measures received quality based on a downlink signal; and a reporting unit which reports, to a base station which covers an area in which the user apparatus is located, the received quality measured by the received quality measuring unit, wherein the received quality measuring unit measures the received quality based on second known signals for use specific to the first base station and the second base station, respectively, that are transmitted by the first base station or the second base station.

The present method is a method in a mobile communications system having a first base station and a second base station, including a signal generating step in which the first base station and the second base station generate a first known signal for use in common between the first base station and the second base station and second known signals for use specific to the first base station and the second base station, respectively; and a step in which the first base station and the second base station wirelessly transmit, to a subordinate terminal apparatuses, the first known signal and the second known signal generated in the signal generating step.

Advantage of the Invention

Embodiments of the present invention make it possible to achieve a radio communications system, a base station, a user apparatus, and a method that make it possible to reduce handover processing burden between the base station and neighboring base stations, and to measure received quality in each cell when a technique is applied in which one base station collectively manages radio resources for the neighboring base stations.

DESCRIPTION OF THE PREFERRED EMBODIMENTS

Description of Notations $100_n$ ($100_1$, $100_2$, ..., $100_n$) control base stations; 102 user information receiver; 104 unit for receiving information within base station; 106 unit for transmitting information within base station; 108 resource allocation determining unit; 110 allocation information transmitter; 112 transmitter; 1122 channel multiplexer; 1124 inverse fast Fourier transforming unit (IFFT); 114 base station group determining unit; 116 reference signal generator; $200_m$ ($200_1$, $200_2$, ..., $200_m$) remote base stations; 202 user information receiver; 204 unit for transmitting information within base station; 206 allocation information receiver; 208 transmitter; 210 reference signal generator; 300 user apparatus; 302 fast Fourier transforming unit (FFT); 304 channel separator; 306 channel/received quality estimator; 308 common control channel demodulator; 310 unit for estimating CQI, PMI, and optimal connection base station Best Mode of Carrying Out the Invention With reference to the drawings, a description is given below with regard to embodiments of the present invention. Throughout the drawings for explaining the embodiments, same letters are used for those having the same functions, so that repetitive explanations are omitted.

Radio Communications System

Figure 1:
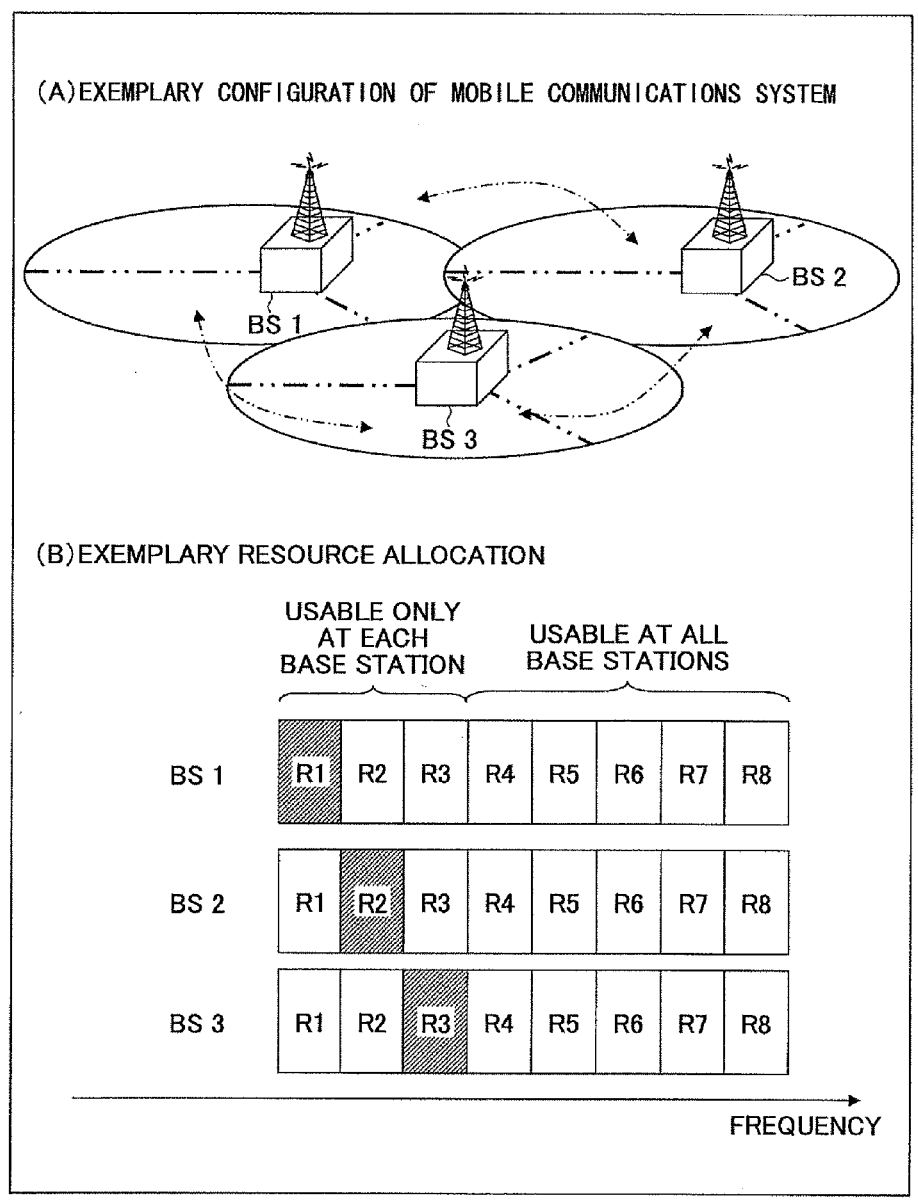
FIG. 1 is an explanatory drawing illustrating a radio communications system.
Figure 2:
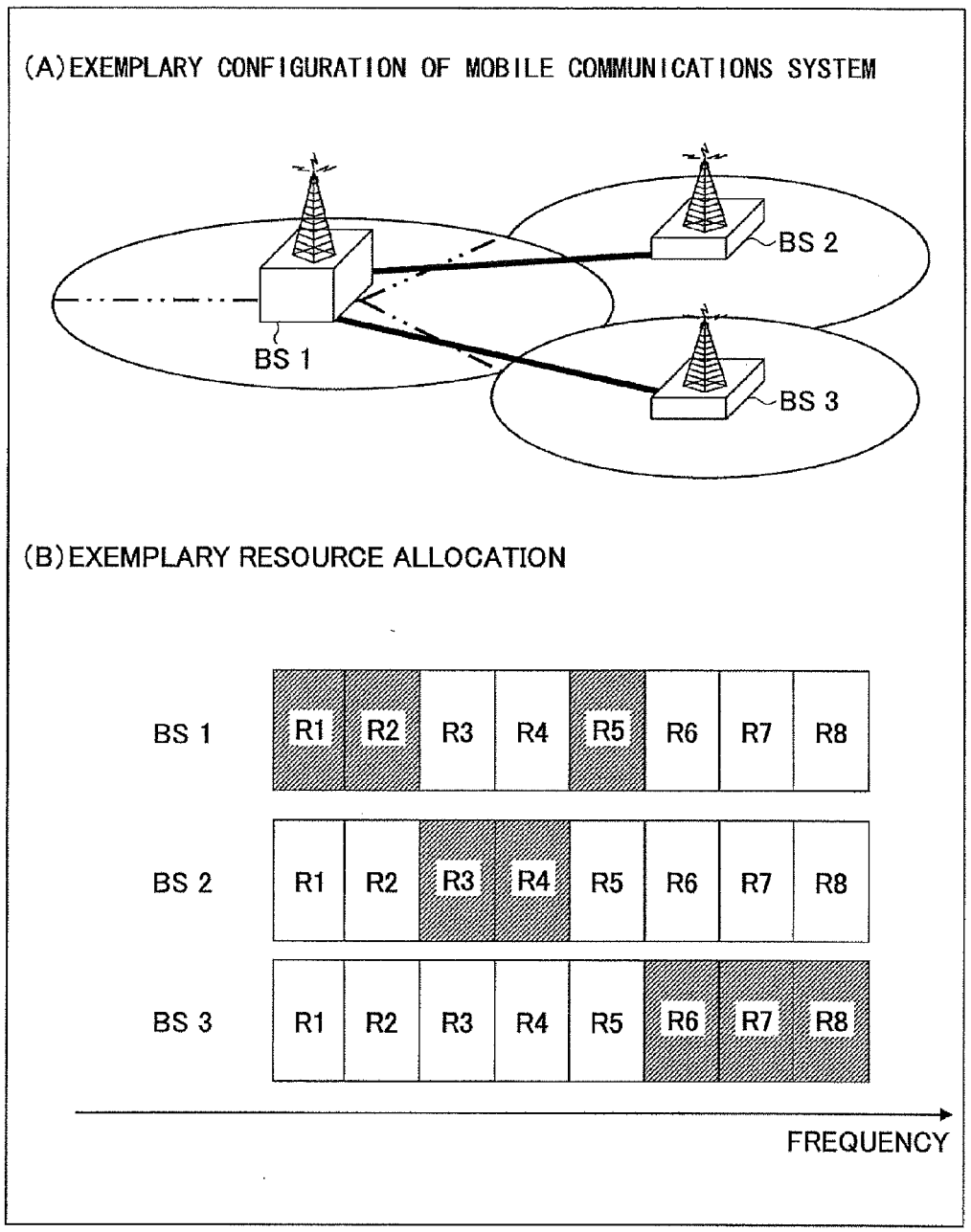
FIG. 2 is another explanatory drawing illustrating the radio communications system.
Figure 3:
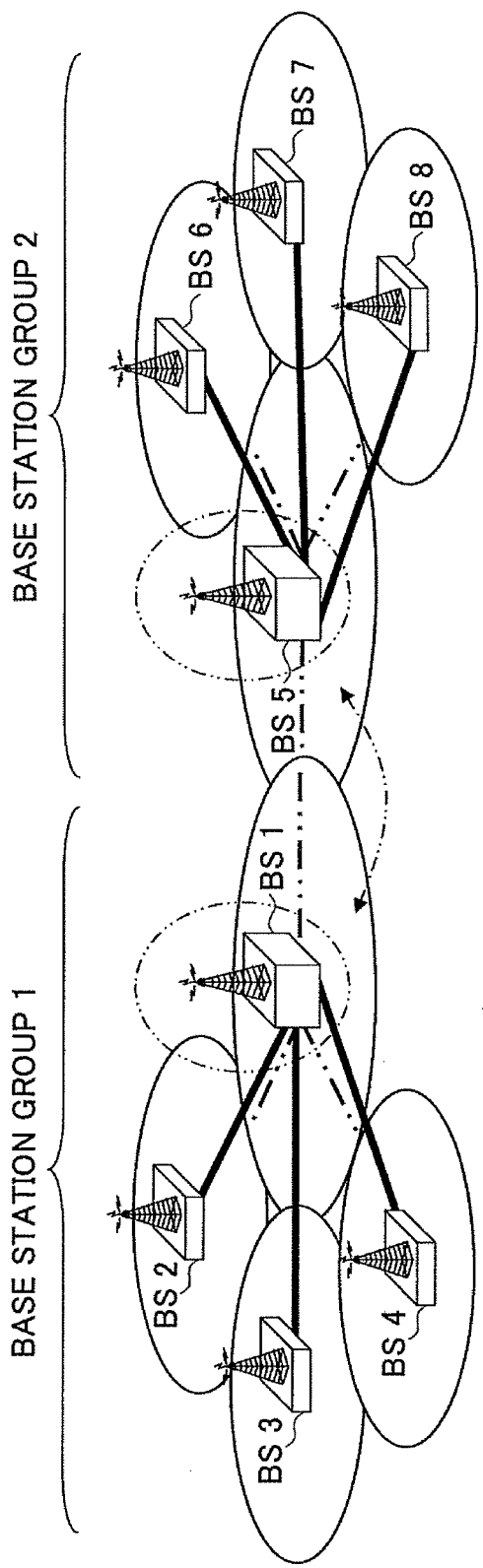
FIG. 3 is an explanatory diagram illustrating the radio communications system according to an embodiment.

With reference to FIG. 3, an explanation is given for a radio communications system having user apparatuses and base stations according to the present embodiment. The user apparatuses may be called mobile station apparatuses.

The radio communications system is a system to which Evolved UTRA and UTRAN (also known as Long Term Evolution) is applied, for example. In the radio communications system, distributed autonomous intercell interference coordination and central control intercell interference coordination are used together. The distributed autonomous intercell interference coordination and the central control intercell interference coordination may be used together to reduce processing burden of the control base station while realizing quick intercell orthogonalization.

In the radio communications system, as radio access schemes, OFDMA (orthogonal frequency division multiple access) is applied for downlink, while SC-FDMA (single-carrier frequency division multiple access) is applied for uplink. The OFDMA is a scheme for dividing a frequency band into multiple narrow frequency bands (sub-carriers) and overlaying data onto the respective frequency bands. The SC-FDMA is a transmission scheme which divides a frequency bandwidth and transmits using different frequency bands among multiple user apparatuses to make it possible to reduce interference between the user apparatuses.

The radio communications system has multiple base station groups (a BS group 1 and a BS group 2). Here, a base station group is a collection of base stations for which radio resources are managed (controlled) by one control base station (eNB: eNodeB). Base station groups 1 and 2 have respective control base stations, BS1 and BS5. The control base station BS1 collectively manages (controls) radio resources for remote base stations BS2-BS4 within the base station group 1 and radio resources for the control base station BS1. The control base station BS5 collectively manages (controls) radio resources for base stations BS6-BS8 within the base station group 2 and radio resources for the control base station BS5. In other words, within the base station group, central control intercell interference coordination is performed by the control base station. FIG. 3 shows an exemplary case in which a control base station manages radio resources for three remote base stations, but managing radio resources for remote base stations numbering any number other than three may also be applied.

On the other hand, for a user located in a border of a communications area covered by a base station which belongs to a base station group, the control base station BS1 allocates radio resources usable only at the corresponding base stations. For example, for a user located in a cell-edge region close to the control base station BS5 out of an area covered by the control base station BS1, the control base station BS1 allocates radio resources usable only at the corresponding base stations. Information on a radio resource usable only at one base station is shared among the control base stations by using a backhaul and/or radio control signal. In other words, within the base station group, distributed autonomous intercell interference coordination is performed. Distributed autonomous intercell interference coordination is performed among the base station groups, so that radio resources are collectively managed by the control base station within the base station group, making it possible to reduce intercell interference. It suffices for the control base station to manage radio resources of the base stations within the base station group, so that even when the number of base stations increases, it is made possible to reduce the processing burden of the control base station.

Figure 4:
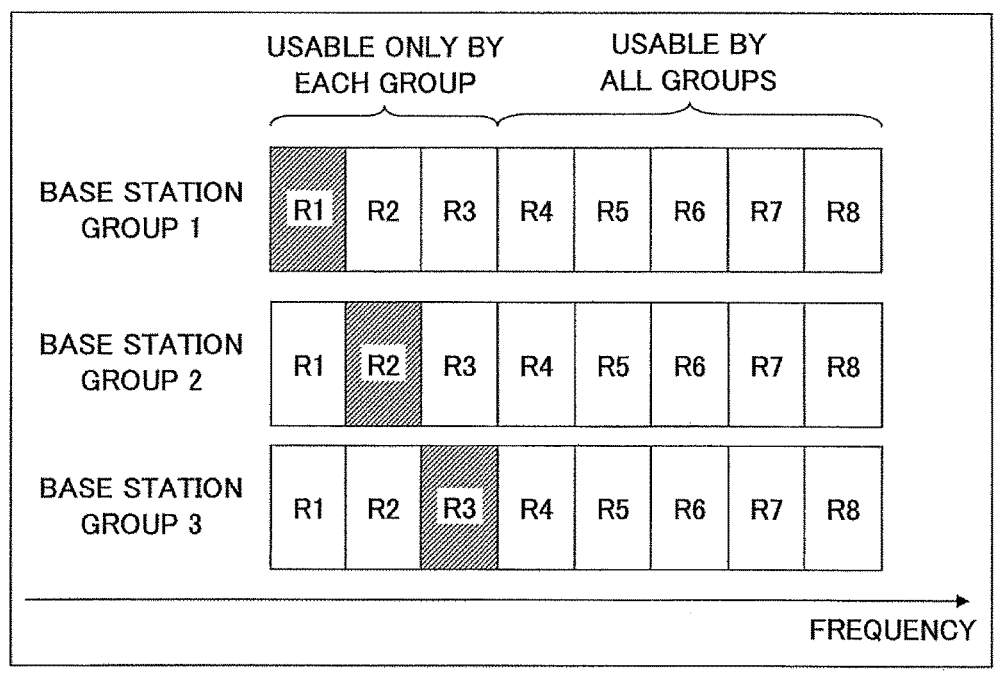
FIG. 4 is an explanatory diagram illustrating an example of resource allocation in the radio communications system according to one embodiment.

An exemplary radio resource allocation for using distributed autonomous intercell interference coordination and central control intercell interference coordination is explained with reference to FIG. 4.

In the intercell interference coordination according to the present embodiment, radio resources include radio resources R1-R3, which are usable only by the respective base station groups and radio resources R4-R8, which are usable in a manner common to all base station groups. The radio resources R1-R3 are frequencies allocated to users located at a communications area border of a base station group. The radio resources R4-R8 are frequencies allocated to users located at a location other than the communications area border of the base station group. The radio resources R4-R8 are allocated, for example, to a user located at a cell border between a remote base station and a control base station, and a user located in the vicinity of a base station.

For example, the radio resource R1 is used for a user belonging to a communications area border of a base station group 1, while the radio resource R1 is not used in neighboring base station groups 2 and 3. Similarly, the radio resource R2 is used for a user belonging to a communications area border of abase station group 2, while the radio resource R2 is not used in neighboring base station groups 1 and 3. The radio resource R3 is used for a user belonging to a communications area border of the base station group 3, while it is not used for neighboring base station groups 1 and 2. Thus, a user located in the communications area border of the base station groups 1-3 may conduct communications with small interference.

The control base station of the base station group 1 allocates radio resources to a base station within the base station group using the radio resource R1 which is usable by only the base station group 1 and the radio resources R4-R8 which are usable in a manner common to all base station groups. For example, the control base station BS1 in FIG. 3 allocates the radio resources R1 and R4 to users within the control base station BS1, allocates the radio resources R5 and R6 to users within the base station BS2, and allocates the radio resource R8 to users within the base station BS4. When the intercell interference is low with mutually distant communications areas such as the base stations BS2 and BS4 in FIG. 3, the control base station BS1 in FIG. 3 may allocate the same radio resource to a user within the base station BS2 and a user within the base station BS4.

When the intercell interference is small with mutually distant communications areas, the same radio resource is allocated, making it possible to achieve effective utilization of radio resources and to improve throughput of users within the cell. Moreover, it is made possible to improve throughput for the cell-edge user.

In the above-described embodiment, radio resources R1-R3 have been described as usable only by corresponding base station groups. However, the radio resources R1-R3 may be set such that they are not usable at other base station groups. For example, the radio resource R1 is unusable by only the base station group 1, the radio resource R2 is unusable only by the base station group 2, and the radio resource R3 is unusable only by the base station group 3.

Moreover, in a radio communications system according to the present embodiment, the control base station and the remote base stations transmit a downlink reference signal (DL-RS) as a pilot signal which is used in a manner common among UEs. For example, the DL RS is used for channel estimation for decoding physical downlink shared channel (PDSCH), physical downlink control channel (PDCCH), physical control format indicator channel (PCFICH), HARQ indicator channel (PHICH: physical HARQ indicator channel) and for calculation of CQI (channel quality indicator), which is radio quality information for downlink. A reference signal transmitted by a control base station and a remote base station includes two sequences. Based on the reference signal, the user apparatus performs channel estimation, and measurement of received quality. The two sequences include a sequence to be used in common among the base station group (below-called common RS), and multiple independent sequences to be used specifically for the assigned one of the control base station and the remote base station (below-called independent RS). For example, the common RS differs from one control base station to another. Moreover, the common RS differs for remote stations which belong to a different control base station, for example. Furthermore, the independent RS is independent among remote base stations which belong to the control base station. In other words, the independent RS differs among remote base stations which belong to the control base station. In a radio communications system according to the present embodiment, the common RS and independent RS are jointly used.

In an example shown in FIG. 3, the common RS is transmitted from the control base station BS1 and the remote base stations BS2-BS4. The common RS is synthesized over the air and received at the user apparatus. The user apparatus does not know which base station the common RS is transmitted from. In other words, there are no apparent cell borders among the four base stations. A common RS is transmitted from the control base station BS1 and remote base stations BS2-BS4, so that a common control channel may be transmitted from the four base stations simultaneously, making it possible to improve received quality for a user apparatus located at the cell border. Here, the common control channel includes broadcast and paging channels.

Moreover, a burden in a handover process between a control base station and a remote base station which belongs to the control base station may be reduced. It is anticipated that applying a remote base station causes a cell radius to become small in the future. In such a case, it is anticipated that, when independent RSs are applied to a control base station and each of the remote base stations which belong to the control base station, handover occurs frequently. A common RS may be applied between a control base station and a remote base station which belongs to the control base station to reduce the burden of the handover process as a cell ID does not change.

Moreover, in an example shown in FIG. 3, independent RSs are transmitted from the control base station BS1 and the remote base stations BS2-BS4. The user apparatus receives data transmitted by one base station. Therefore, the user apparatus needs to measure the received quality, for example, CQI, for each base station. Moreover, the user apparatus needs to measure the received quality (for example, CQI) for determining a precoding matrix indicator for each base station. In such a case, an independent RS is used. Moreover, based on the independent RS, the user apparatus performs the process of selecting an optimal connecting cell at high speed. For example, when a connecting cell is switched between a control base station and a remote base station which belongs to the control base station, a process of switching a transmission antenna is performed. This process is performed at a physical layer. Moreover, when a connecting cell is switched to a different control base station or a remote base station which belongs to the different control base station, the process is performed at an upper layer.

Control Base Station and Remote Base Station

Figure 5:
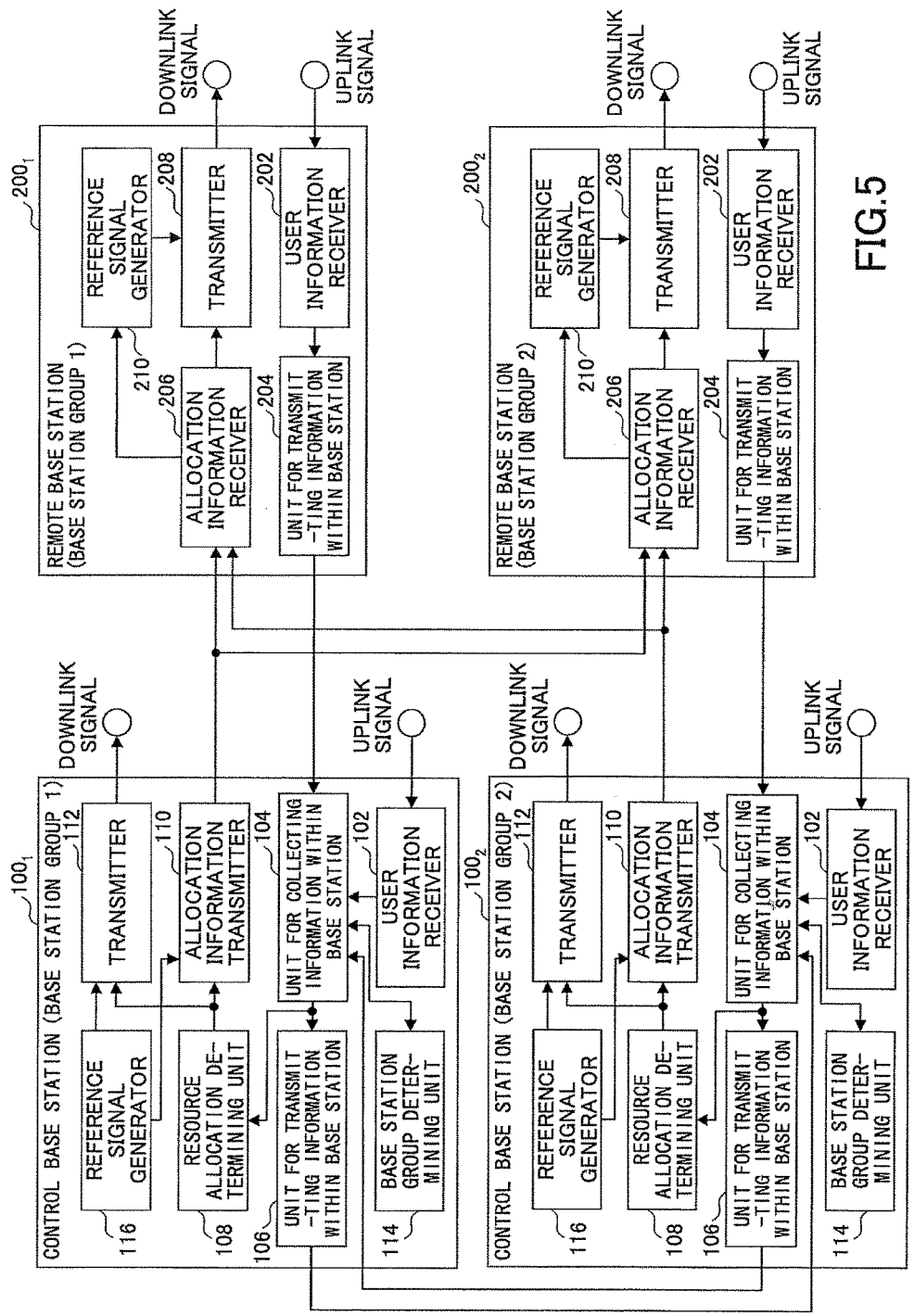
FIG. 5 is a partial block diagram illustrating the control base station and the remote base station according to one embodiment.

Control base stations and remote base stations according to the present embodiment are explained with reference to FIG. 5.

A radio communications system according to the present embodiment has one or more control base stations $100_n$ (n is an integer greater than 0). Moreover, the control base station $100n$ according to the present embodiment has one or more remote base stations $200_m$ (where m is an integer greater than 0). FIG. 5 shows, as an example, a case such that the radio communications system has two control base stations $100_1$ and $100_2$. Moreover, in FIG. 5, a case is shown of one control base station having one remote base station, as an example. For example, a base station group 1 has a control base station $100_1$ and a remote base station $200_1$. Moreover, for example, a base station group 2 has a control base station $100_2$ and a remote base station $200_2$. Furthermore, it may be arranged for the remote base station 200 to belong to multiple base station groups.

Below, the control base stations $100_n$ ($100_1$, $100_2$, ..., $100_n$) have the same configuration, function, and status. Thus, unless otherwise indicated, they will be explained below as the control base station $100_n$. Below, remote base stations $200_m$ ($200_1$, $200_2$, ..., $200_m$) have the same configuration, function, and status. Thus, unless otherwise indicated, they will be explained below as the remote base station 200.

Control Base Station

Control base station 100 is a base station which collectively manages radio resources within a base station group. In other words, the control base station 100 has a function as a supervisory base station which supervises subordinate remote base stations 200. The control base station 100 has a user information receiver 102, a unit for collecting information within base station 104, a unit for transmitting information within base station 106, a resource allocation determining unit 108, an allocation information transmitter 110, a transmitter 112, a base station group determining unit 114, and a reference signal generator 116.

The user information receiver 102 receives an uplink signal transmitted by a user apparatus located in an area covered by the control base station 100, and obtains user information based on the uplink signal. The user information may include the number of users, location of the user, traffic volume, received quality, etc. The user information may be determined within the control base station 100 based on an uplink signal received from the user apparatus.

The unit for collecting information within base station 104 collects within the base station the user information obtained at the user information receiver 102. The information within the base station may include processing burden of the control base station. Moreover, the information within the base station may include user information of a remote base station which belongs to the control base station. Furthermore, the unit for collecting information within base station 104 may collect, within other base stations, user information and/or information within base station from a base station in other base station groups in order to change the base station group based on the user information and/or information within base station. For example, the unit for collecting information within base station 104 may collect the information within the base station and/or user information within another base station from another control base station in another base station group.

The unit for transmitting information within the base station 106 transmits, to other control base stations, the information within base station and/or user information collected at the unit for collecting information within base station 104.

Based on the information within base station and/or user information, a resource allocation determining unit 108 determines radio resources usable at a control base station and radio resources usable at a remote base station which belongs to the control base station. For example, as described with reference to FIG. 4, when radio resources include a radio resource usable by only one base station group and a radio resource usable in a manner common to all base station groups, the resource allocation determining unit 108 determines a radio resource usable at the control base station 100 and a radio resource usable at the remote base station 200 out of radio resources usable only by base station group 1 and a radio resource usable in a manner common to all base station groups.

The allocation information transmitter 110 transmits, to the remote base station 200, information on allocating radio resources usable at the remote base station 200 which belongs to the control base station 100. Moreover, the allocation information transmitter 110 transmits, to the remote base station, information for generating an independent RS to be used specifically by own base station for the control base station 100 and each remote base station and information for generating a common RS input by the reference signal generator 116. For example, the control base station 100 and the remote base station 200 are connected over wire.

The transmitter 112 allocates a radio resource to be actually used for transmission of user data out of radio resources usable at the control base station 100. Moreover, the transmitter 112 wirelessly transmits, to a subordinate user terminal, a downlink signal which includes a reference signal.

The base station group determining unit 114 determines a base station group based on information within base station and/or user information received from a remote base station and/or control base station which belongs to another base station group and a remote base station which belongs to the control base station 100. For example, the base station group determining unit 114 determines a base station group such that the number of remote base stations is equalized. Moreover, the base station group determining unit 114 may determine the base station group such that the user apparatuses located in the base station group are equalized. Furthermore, the base station group determining unit 114 may determine the base station group such that the traffic volume of the base station group is equalized. Moreover, the base station group determining unit 114 may be arranged to determine a base station group such that the number of users located at the communications area border of the base station group is reduced. Furthermore, the base station group determining unit 114 may be arranged to determine a base station group such that the received quality at the communications area border of the base station group is improved. The determining of the base station group may be performed in a centralized manner at one control base station or it may be coordinated among multiple control base stations.

The base station group determining unit 114 reports the determined base station group to the unit for collecting information within base station 104. The unit for collecting information within base station 104 collects information within the base station and/or user information within the base station group based on the reported base station group. Moreover, the resource allocation determining unit 108 determines a radio resource within the determined base station group. For example, the unit for collecting information within base station 104 stops collecting information within the base station and/or user information from a remote base station 200 which no longer belongs to the base station group. The base station group determining unit 114, which is typically included in the base station, may be included in a node which manages multiple base stations, such as RNC (Radio network controller).

The reference signal generator 116 generates a reference signal. The reference signal is a signal which is known between the base station and the user apparatus. The reference signal includes the common RS and independent RS as described above. Moreover, the reference signal generating unit 116 generates information for generating the common RS, and information for generating the independent RS to be specifically used by each base station for each of the control base station 100 and each remote base station. Then, the reference signal generating unit 116 inputs, into the allocation information transmitter 110, information for generating the common RS, and information for generating the independent RS to be specifically used by each base station for each of the control base station 100 and each remote base station. For example, the common RS may include a predetermined sequence (for example, Non-patent document 2). Moreover, for example, the independent RS may preferably be orthogonalized between the control base station and the remote base station. For example, for orthogonalizing a reference signal between the remote base stations, code division multiplexing (CDM) may be applied, frequency division multiplexing (FDM) may be applied, or time division multiplexing (TDM) may be applied.

Moreover, for example, the independent RS preferably includes a sequence to which frequency shift is applied between the control base station and the remote base station. For example, the transmitting frequency of a reference signal transmitted by the control base station and each remote base station may be shifted. Moreover, for the independent RS, a time shift may be applied between the control base station and the remote base station. For example, the transmitting timing of the reference signal transmitted by the control base station and each remote base station may be shifted. Shifting the transmitting timing of the reference signal transmitted by the control base station and each remote base station makes it possible to orthogonalize the reference signal between the control base station and the remote base station. Moreover, the received quality measured in the user apparatus may be improved. Furthermore, the transmitting frequency and transmitting timing of a reference signal transmitted by the control base station and each remote base station may be shifted.

Moreover, the independent RS may be arranged to be include a sequence to which is applied a scramble code using a common RS for use in common between the control base station and the remote base station. For example, the independent RS preferably includes a sequence scrambled with a common RS for use in common between the control base station and the remote base station. The independent RS may be scrambled using the common RS in order to randomize a reference signal between remote base stations which belong to different control base stations.

Figure 6:
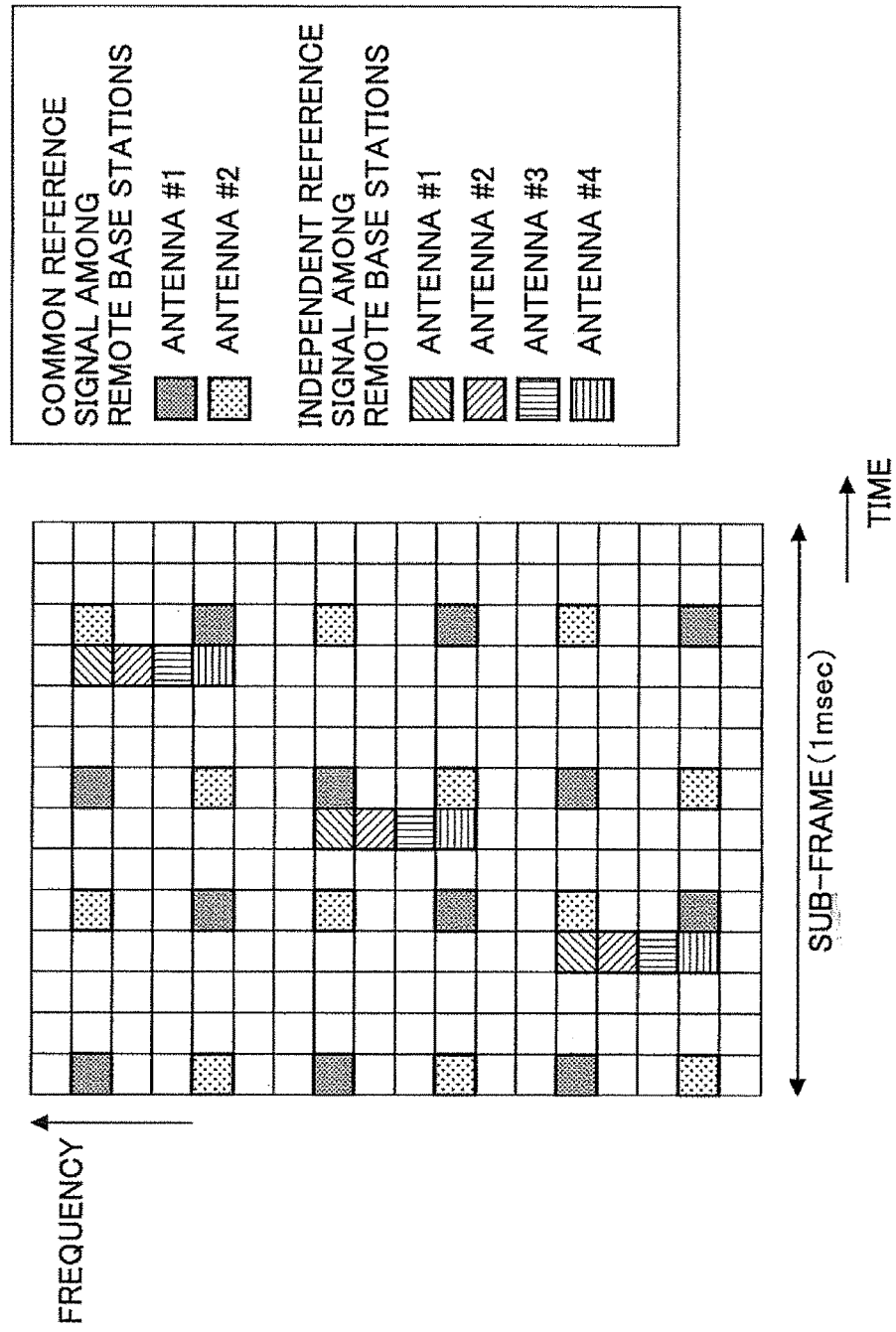
FIG. 6 is an explanatory diagram illustrating one example of mapping of a reference signal transmitted by the remote base station and the control base station according to one embodiment.

Moreover, for example, the common RS and the independent RS are mapped as shown in FIG. 6. As the independent RS is used for measuring received quality in each cell, it suffices for the overhead to be small in comparison to the common RS. For example, the common RS is arranged densely in comparison to the independent RS. Moreover, the common RS may be transmitted with antennas, the number of which is no more than the number of antennas which the control base station has. For example, even when the control base station 100 has multiple antennas, the common RS may be arranged to be transmitted in antennas, the number of which may be smaller than the above-mentioned multiple antennas. For example, the common RS may be transmitted with two antennas. Moreover, it may be transmitted using three or more antennas. On the other hand, the independent RS needs to be transmitted with antennas, the number of which is the number of antennas which the control base station has. This is for the user apparatus to determine the PMI based on the independent RS.

Figure 7:
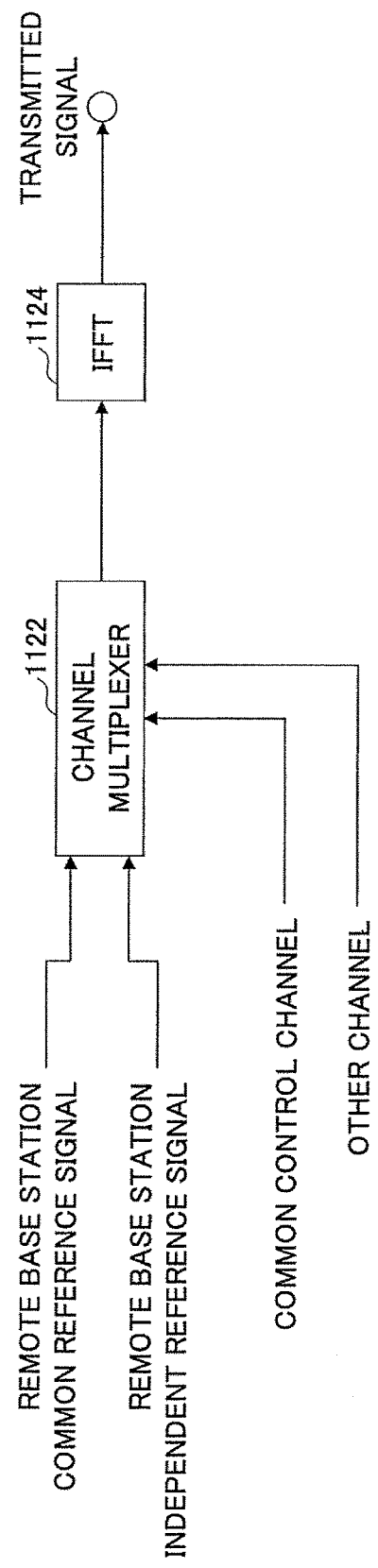
FIG. 7 is a partial block diagram illustrating a transmitter in the remote base station and the control base station according to one embodiment.

A transmitter 112 in the control base station 100 according to the embodiment of the present invention is explained with reference to FIG. 7.

The transmitter 112 has a channel multiplexer 1122 and an inverse fast Fourier transforming unit (IFFT) 1124.

To the channel multiplexer 1122 are input a common RS for use in common in the control base station and the remote base station and an independent RS for use specific to each of the control base station and the remote base station. For example, the common RS and the independent RS are input by the reference signal generator 116. Moreover, a common control channel and a channel other than the common control channel are input. As described above, the common control channel includes broadcast and paging channels.

The channel multiplexer 1122 multiplexes channels input. For example, the channel multiplexer 1122 performs mapping as described with reference to FIG. 6. A signal mapped in the channel multiplexer 1122 is input to the IFFT 1124.

The IFFT 1124 performs inverse fast Fourier transform on the signal input. The inverse fast Fourier transformed signal is subsequently transmitted wirelessly to the user apparatus 300 as a transmitting signal.

Remote Base Station

The remote base station 200 is a base station for which radio resources are managed by the control base station 100. The remote base station 200 has a user information receiver 202, a unit for transmitting information within base station 204, an allocating information receiver 206, a transmitter 208, and a reference signal generator 210.

The user information receiver 202 receives an uplink signal from a user apparatus located in an area covered by the remote base station 200, and collects user information based on the uplink signal. The user information may include the number of users, location of the users, traffic volume, and received quality.

The unit for transmitting information within base station 204 transmits, to the control base station 100, information within the base station and user information collected at the user information receiver 202. The information within the base station may include processing burden in the remote base station 200.

The allocating information receiver 206 receives, from the control base station 100, information for allocating radio resources usable at the remote base station 200. Moreover, the allocating information receiver 206 receives, from the control base station 100, information for generating a common RS, and information for generating independent RSs to be specifically used by the base stations one for the control base station 100 and one for each remote base station. The allocating information receiver 206 inputs, into the reference signal generator 210, the received information for generating the common RS and information for generating the independent RSs to be specifically used by the base stations one for the control base station 100 and one for each remote base station.

The transmitter 208 allocates a radio resource to be actually used for transmission of user data out of radio resources usable at the remote base station 200, and performs data transmission. Moreover, the transmitter 208 wirelessly transmits, to a subordinate user terminal, a downlink signal, including a reference signal.

Furthermore, when the remote base station 200 belongs to multiple base station groups, the allocation information receiver 206 receives allocation information from multiple control base stations. For example, the transmitter 208 determines a base station group according to a location of a user, and uses a radio resource allocated from a control base station of a determined base station group to transmit data. The radio resource allocated from the control base station of the base station group determined according to the location of the user is used to transmit the data, making it possible to perform control such that radio resources allocated from multiple control base stations do not overlap.

The reference signal generator 210 generates a reference signal. For example, the reference signal generator 210 generates a reference signal based on information for generating a common RS input by the allocation information receiver 206, and information for generating independent RSs to be specifically used by the base stations one for the control base station 100 and one for each remote base station. The reference signal includes the common RS and the independent RS as described above. For example, the common RS may include a predetermined sequence. Moreover, for example, the independent RS may preferably be orthogonalized between the control base station and the remote base stations. For example, for orthogonalizing a reference signal between the remote base stations, code division multiplexing may be applied, frequency division multiplexing may be applied, and time division multiplexing may be applied.

Moreover, for example, the independent RS preferably includes a sequence to which frequency shift is applied between the control base station and the remote base station.

For example, the transmitting frequency of a reference signal transmitted by the control base station and each remote base station may be shifted. Moreover, for the independent RS, a time shift may be applied between the control base station and the remote base station. For example, the transmitting timing of a reference signal transmitted by the control base station and each remote base station may be shifted. In this way, a reference signal may be orthogonalized between the control base station and the remote base stations. Moreover, the received quality measured in the user apparatus may be improved. Furthermore, the transmitting frequency and transmitting timing of a reference signal transmitted by the control base station and each remote base station may be shifted.

Moreover, the independent RS may be arranged to include a sequence to which is applied a scramble using a common RS for use in common between the control base station and the remote base station. For example, the independent RS preferably includes a sequence scrambled with a common RS for use in common between the control base station and the remote base station. The independent RS may be scrambled using the common RS in order to randomize a reference signal between remote base stations which belong to different control base stations.

Moreover, for example, the common RS and the independent RS are mapped as described with reference to FIG. 6. As the independent RS is used for measuring received quality in each cell, it suffices for the overhead to be small in comparison to the common RS. For example, the common RS is arranged densely in comparison to the independent RS. Moreover, the common RS may be transmitted with antennas, the number of which is no more than the number of antennas which the remote base station has. For example, even when the remote base station 200 has multiple antennas, the common RS may be arranged to be transmitted with antennas, the number of which being smaller than the above-mentioned multiple antennas. For example, the common RS may be transmitted with two antennas. Moreover, it may be transmitted using three or more antennas. On the other hand, the independent RS needs to be transmitted with antennas, the number of which is the number of antennas which the remote base station has. This is for the user apparatus to determine the PMI based on the independent RS.

For the transmitter 208 in the remote base station 200 according to the present embodiment, it is similar to the transmitter described with reference to FIG. 7.

User Apparatus

Figure 8:
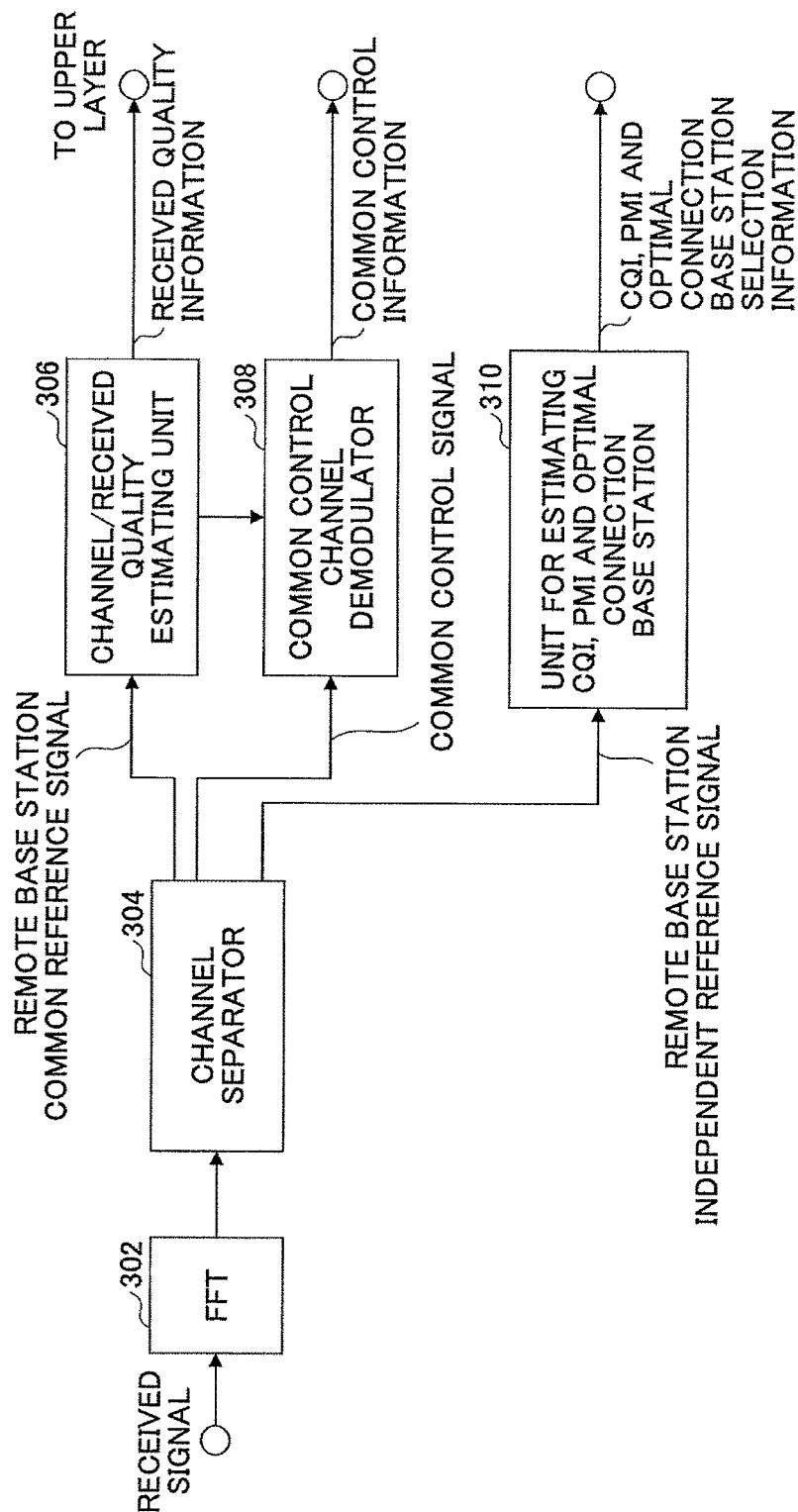
FIG. 8 is a partial block diagram illustrating a user apparatus according to one embodiment.

A user apparatus according to the present embodiment is explained with reference to FIG. 8.

The user apparatus 300 according to the present embodiment includes a fast Fourier transforming unit 302, a channel separator 304, a channel/received quality estimating unit 306, a common control channel demodulator 308, and a unit for estimating CQI, PMI, and optimal connection base station 310.

The FFT 302 performs fast Fourier transformation on a downlink signal transmitted by a remote base station 200 or a control base station 100 which covers an area in which the user apparatus is located. The FFT 302 inputs the fast Fourier transformed downlink signal to the channel separator 304.

The channel separator 304 separates a channel included in the fast Fourier transformed downlink signal input. For example, the downlink signal includes a common RS, an independent RS, and a common control channel. The channel separator 304 inputs the common RS into the channel/received quality estimating unit 306. Moreover, the channel separator 304 inputs the common control channel into the common control channel demodulator 308. Furthermore, the channel separator 304 inputs the independent RS into a unit for estimating CQI, PMI, and optimal connection base station 310.

The channel/received quality estimating unit 306 estimates received quality and/or channel quality of the common RS based on the input common RS. The received quality includes the CQI. For example, the channel/received quality estimating unit 306 may measure the received quality based on the common RS in the following cases:

(1) When data are simultaneously transmitted from the control base station and the remote base station in downlink; and (2) When located in the vicinity of the control base station or the remote base station.

This is because, for (2), a signal transmitted from a base station other than the control base station or the remote base station may be ignored.

The channel/received quality estimating unit 306 reports, to an upper layer, received quality information which indicates the estimated received quality. Moreover, the channel/received quality estimator 306 inputs the received quality information into the common control channel demodulator 308.

The common control channel demodulator 308 demodulates a common control channel input, based on received quality information input by the channel/received quality estimator 306. Then, the common control channel demodulator 308 reports, to the upper layer, common control information, which is a demodulated common control channel.

The unit 310 for estimating CQI, PMI, and optimal connection base station estimates CQI based on an independent RS. Moreover, the CQI, PMI, and optimal connection base station estimating unit 310 determines PMI based on the independent RS. For example, based on the predetermined precoding vector, the unit for estimating CQI, PMI, and optimal connection base station 310 estimates received quality when the precoding vector is applied. Moreover, the CQI, PMI, and optimal connection base station estimating unit 310 determines an optimal base station as a party to connect to. Then, the unit for estimating CQI, PMI, and optimal connecting base station 310 reports, to an upper layer, the estimated CQI, PMI, and base station which is optimal as a party to connect to. The PMI may include an index corresponding to a precoding vector and received quality when the precoding vector is applied.

For example, the unit for estimating the CQI, PMI, and optimal connection base station 310 may measure received quality based on an independent RS when data is transmitted from a single control base station or remote base station in downlink.

Moreover, in the above-described user apparatus 300, a received quality (CQI) which is measured based on an independent RS and a received quality (CQI) which is measured based on a common RS may be compared to report one of the received qualities to the upper layer. For example, a received quality estimated based on an independent RS in the unit for estimating CQI, PMI, and optimal connection base station 310 and a received quality estimated based on a common RS in the channel/received quality estimating unit 306 may be compared and report the better received quality to the upper layer. In this case, the user apparatus 300 may be arranged to measure the received quality based on an independent RS included in a reference signal transmitted from the remote base station 200 and/or multiple control base stations 100 which can receive the user apparatus 300.

Operation of Radio Communications System (Part 1)

A radio communications system according to the present embodiment is described with reference to FIG. 9.

Based on the received quality measured by a user apparatus 300, a process is explained of switching connecting cells at high speed within a base station group.

The user apparatus 300 is located in an area covered by a remote base station $200_1$.

A control base station 100, and remote base stations $200_1$ and $200_2$ transmit a reference signal (steps S802, S804, and S806).

The reference signal is received at the user apparatus 300. The user apparatus 300 measures the received quality of the reference signal (step S808). For example, the user apparatus 300 measures the received quality based on an independent RS included in the reference signal. Then, the user apparatus 300 reports, to a remote base station $200_1$ which covers an area in which the user apparatus 300 is located, a received quality and an ID of a base station with the best received quality based on the measured received quality (step S810).

The remote base station $200_1$ reports, to the control base station 100 a received quality and an ID of a base station with the best received quality that is reported (step S812).

Based on the received quality and base station ID of the base station that is reported, the control base station 100 switches the base station to be connected to the user apparatus 300 to the reported base station (step S814). For example, the control base station 100 switches the base station to be connected to the user apparatus 300 to the remote base station $200_2$.

The control base station 100 transmits, to the remote base station $200_2$, data to be transmitted to the user apparatus 300.

The remote base station $200_2$ transmits, to the user apparatus 300, data transmitted by the control base station 100 (step S818).

Operation of Radio Communications System (Part 2)

Other operations of the radio communications system according to the present embodiment is described with reference to FIG. 10.

A process is explained of performing handover which involves changing a base station group based on received quality measured by the user apparatus 300.

The user apparatus 300 is located in an area covered by a remote base station $200_1$. The remote base station $200_1$ belongs to a base station group 1.

A control base station $100_1$, a remote base station $200_1$, a control base station $100_2$ and a remote base station $200_2$ transmit reference signals (steps S902, S904, S906, and S908).

The reference signals are received at the user apparatus 300. The user apparatus 300 measures the received quality of the reference signals (step S910). For example, the user apparatus 300 measures the received qualities based on a common RS included in the reference signals. Then, based on the measured received quality, the user apparatus 300 determines whether the received quality meets handover conditions. For example, the user apparatus 300 may determine whether a received quality of a residing base station group 1 is better than a received quality of another base station group 2.

When handover conditions are met, the user apparatus 300 transmits a handover request to a residing remote base station $200_1$ (step S912).

The handover request is transmitted to a control base station $100_1$ which controls the remote base station $200_1$ (step S914).

The control base station $100_1$ transmits information on connecting with the user apparatus 300 to the control base station $100_2$ of the base station group 2 to handover to (step S916).

The user apparatus 300 transmits a random access channel (RACH) to a remote base station with the best received quality $200_2$ (step S918).

The RACH is transmitted to a control base station $100_2$ which controls the remote base station $200_2$ (step S920).

The control base station $100_2$ performs a process of link connection between the remote base station $200_2$ and the user apparatus 300 (step S922).

The control base station $100_2$ transmits, to the remote base station $200_2$, data to be transmitted to the user apparatus 300 (step S924).

The remote base station $200_2$ transmits, to the user apparatus 300, data transmitted by the control base station $100_2$ (step S926).

Figure 9:
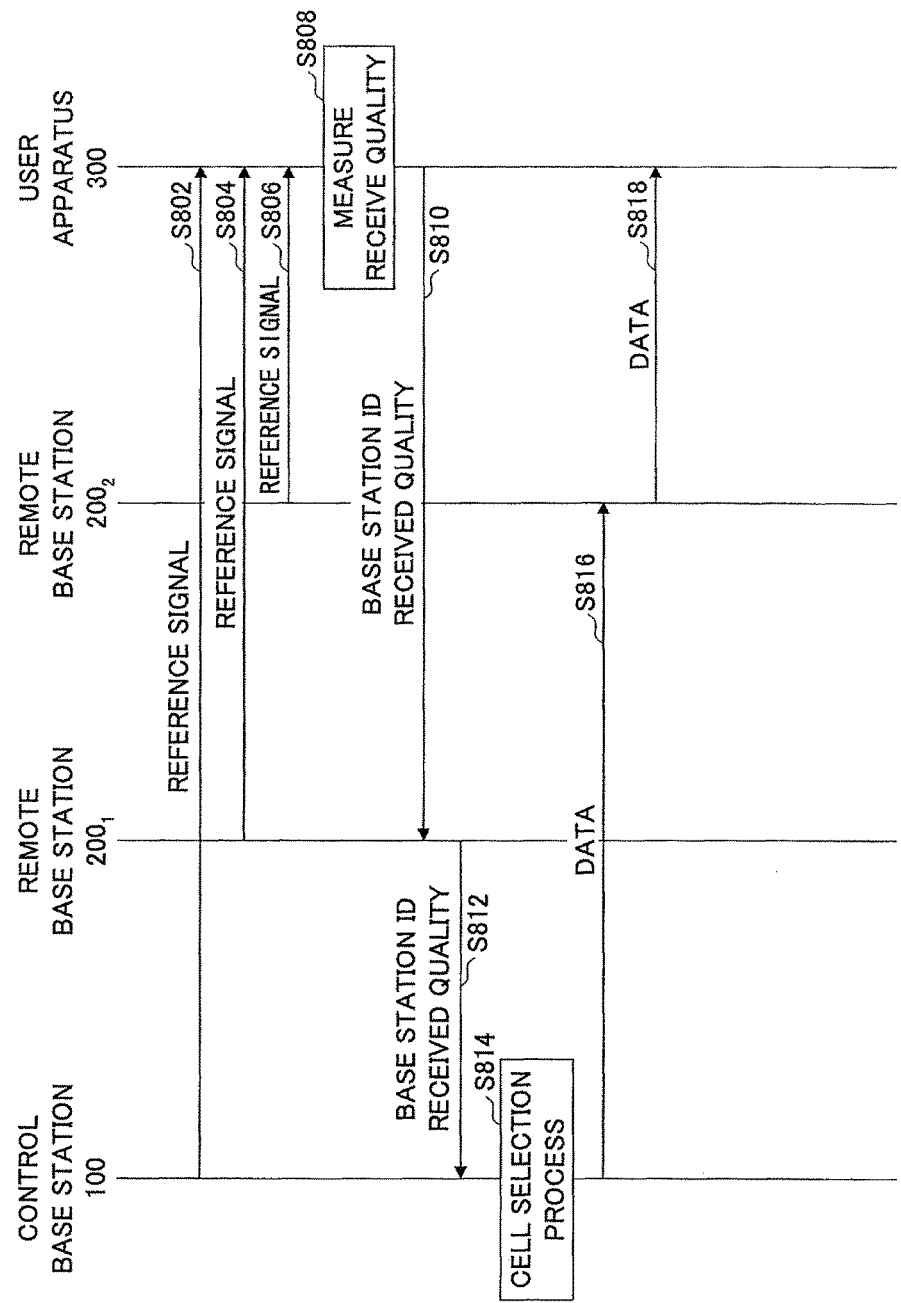
FIG. 9 is a flow diagram illustrating an operation of the radio communications system according to one embodiment.
Figure 10:
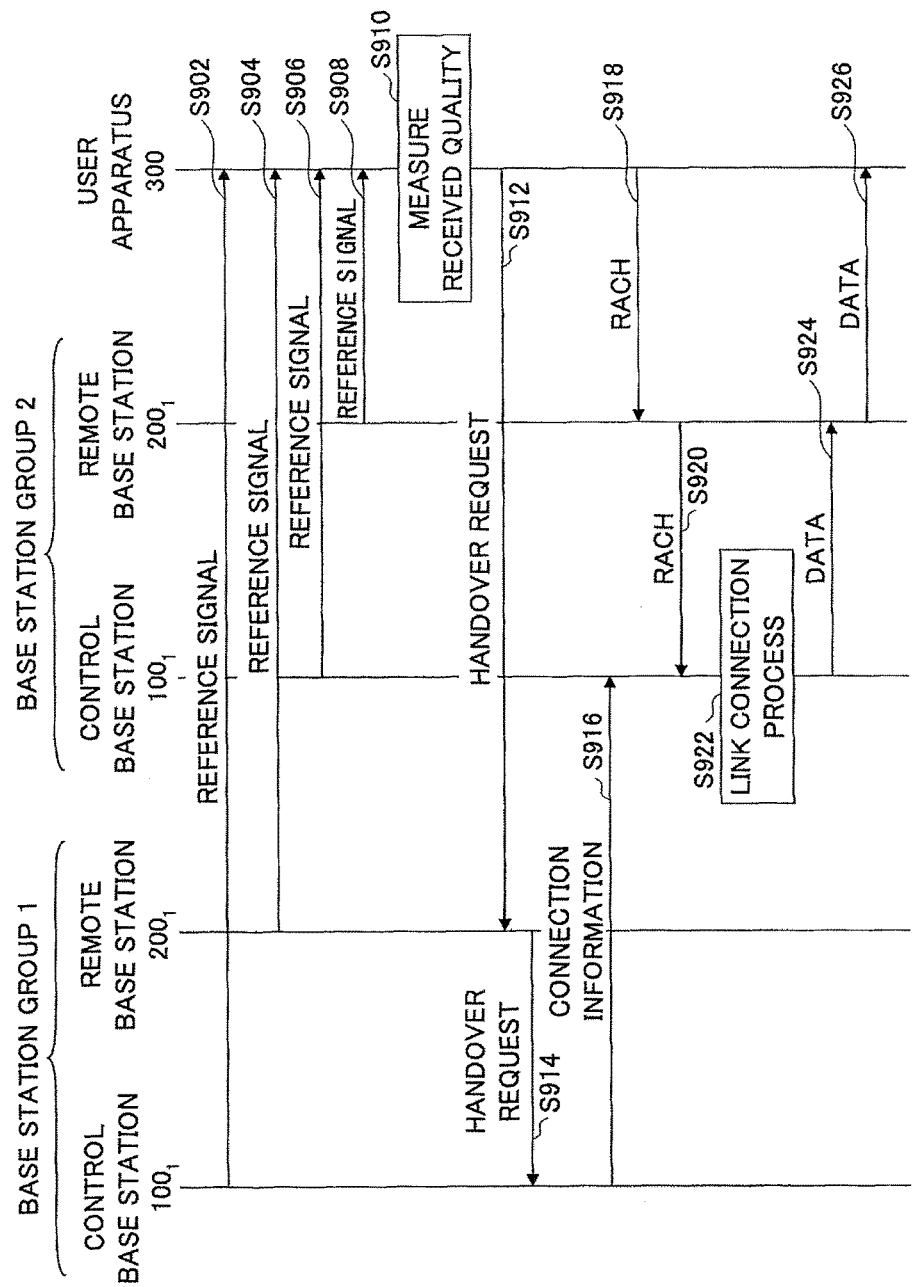
FIG. 10 is another flow diagram illustrating an operation of the radio communications system according to one embodiment.

Processes explained with reference to FIGS. 9 and 10 are performed in parallel. For example, the processes differ in the period thereof. The process explained with reference to FIG. 9 is performed at high speed, while the process explained with reference to FIG. 10 is performed at low speed.

According to the present embodiment, a reference signal transmitted by a control base station and one or more remote base stations controlled by the control base station includes a sequence for use in common between the control base station and remote base stations (first known signal) and sequences for use specific to each of the control base station and the remote base station (second known signals). The control base station and one or more remote base stations which are controlled (supervised) by the control base station may be called a base station group.

A sequence for use in common between the control base station and remote base station is included in a reference signal, so that a common sequence is transmitted in an area covered by a base station group, making it possible to improve the received quality for the user apparatus located at a cell edge. Moreover, cell switching may be performed based on the sequence for use in common between the control base station and the remote base station, making it possible to reduce handover processing burden within the base station group.

Moreover, sequences for use specific to each of the control base station and the remote base station are included in the reference signal, so that a user apparatus may measure the received quality in each cell. Furthermore, cell switching among base stations included in the base station group may be performed at high speed.

In the above described embodiments, examples in systems to which Evolved UTRA and UTRAN (also called Long Term Evolution or Super 3G) is applied have been described. However, the radio communications system, user apparatuses, and methods according to the present invention can be applied to all communications systems with any possibility of intercell interference occurring.

For convenience of explanation, specific numerical value examples are used to facilitate understanding of the present invention. However, unless otherwise specified, such numerical values are merely exemplary, so that any appropriate value may be used.

As described above, while the present invention is described with reference to specific embodiments, the respective embodiments are merely examples, so that a skilled person will understand variations, modifications, alternatives, replacements, etc. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-172813 filed on Jul. 1, 2008, the entire contents of which are hereby incorporated by reference.

The invention claimed is:

1. A mobile communications system, comprising:
a base station; and
a mobile station, wherein
the base station is configured to transmit a first reference signal defined by a cell-specific sequence and a second reference signal defined by a sequence independent of the cell-specific sequence;
the mobile station is configured to receive the first reference signal and the second reference signal, use the first reference signal at least to demodulate a broadcast channel, and use the second reference signal at least to measure a reception quality;
the first reference signal is mapped only to time symbols that are different from time symbols to which the second reference signal is mapped, and the first reference signal is mapped more densely than the second reference signal; and
when another second reference signal of another base station is multiplexed in a first subframe, the base station is configured not to multiplex the second reference signal of the base station in the first subframe, but instead in a second subframe that is different from the first subframe and obtained by shifting the first subframe.

2. The mobile communications system as claimed in claim 1, wherein when the base station includes a plurality of transmission antennas, the second reference signal to be transmitted from one of the transmission antennas is mapped to time and frequency resources that are different from time and frequency resources to which the second reference signal to be transmitted from another one of the transmission antennas is mapped.

3. The mobile communications system as claimed in claim 1, wherein when the base station comprises a plurality of remote base stations, second reference signals of the remote base stations are orthogonalized to each other by one or more of code division multiplexing, frequency division multiplexing, and time division multiplexing.

4. A method for a mobile communications system including a base station and a mobile station, the method comprising:
transmitting, by the base station, a first reference signal defined by a cell-specific sequence and a second reference signal defined by a sequence independent of the cell-specific sequence; and
receiving, by the mobile station, the first reference signal and the second reference signal,
wherein the mobile station uses the first reference signal at least to demodulate a broadcast channel, and uses the second reference signal at least to measure a reception quality;
wherein the first reference signal is mapped only to time symbols that are different from time symbols to which the second reference signal is mapped, and the first reference signal is mapped more densely than the second reference signal; and
wherein when another second reference signal of another base station is multiplexed in a first subframe, the base station is configured not to multiplex the second reference signal of the base station in the first subframe, but instead in a second subframe that is different from the first subframe and obtained by shifting the first subframe.

5. The method as claimed in claim 4, wherein when the base station includes a plurality of transmission antennas, the second reference signal to be transmitted from one of the transmission antennas is mapped to time and frequency resources that are different from time and frequency resources to which the second reference signal to be transmitted from another one of the transmission antennas is mapped.

6. The method as claimed in claim 4, wherein when the base station comprises a plurality of remote base stations, second reference signals of the remote base stations are orthogonalized to each other by one or more of code division multiplexing, frequency division multiplexing, and time division multiplexing.

* * * * *